United States Patent [19]

Yamamoto et al.

[11] Patent Number: 5,956,296
[45] Date of Patent: Sep. 21, 1999

[54] INFORMATION REPRODUCING APPARATUS FOR REPRODUCING INFORMATION BY MAGNETIC WALL MOVEMENT

[75] Inventors: Masakuni Yamamoto, Yamato; Eiichi Fujii, Kamakura; Tsutomu Shiratori, Tokyo, all of Japan

[73] Assignee: Canon Kabushiki Kaisha, Tokyo, Japan

[21] Appl. No.: 08/931,369

[22] Filed: Sep. 16, 1997

[30] Foreign Application Priority Data

Sep. 18, 1996 [JP] Japan ................................. 8-246255
Sep. 3, 1997 [JP] Japan ................................. 9-238284

[51] Int. Cl.$^6$ .................................................. G11B 11/00
[52] U.S. Cl. .................................................. 369/13
[58] Field of Search ........................... 369/13, 14, 110, 369/116; 360/59, 114; 365/122

[56] References Cited

U.S. PATENT DOCUMENTS

| 5,329,517 | 7/1994 | Yamaguchi et al. | 369/110 |
| 5,621,706 | 4/1997 | Kawano et al. | 369/13 |
| 5,648,134 | 7/1997 | Shiratori et al. | 428/641 |
| 5,656,384 | 8/1997 | Nishimura et al. | 428/694 |
| 5,703,841 | 12/1997 | Hiroki | 369/13 |
| 5,740,133 | 4/1998 | Tamanoi et al. | 369/13 |

FOREIGN PATENT DOCUMENTS

| 3-93058 | 4/1991 | Japan . |
| 5-94624 | 4/1993 | Japan . |
| 6-290496 | 10/1994 | Japan . |
| 8-180492 | 7/1996 | Japan . |

*Primary Examiner*—Tan Dinh
*Attorney, Agent, or Firm*—Fitzpatrick, Cella, Harper & Scinto

[57] ABSTRACT

An information reproducing apparatus for reproducing information by moving a magnetic wall along an information track on a recording medium. The apparatus includes an optical system for irradiating the recording medium with a light spot of an oval shape having a longer axis and a shorter axis, of which the longer axis is substantially parallel to the information track and a ratio of the longer axis to the shorter axis is at least 1.4, and a movement device for performing relative movement between the light spot and the recording medium.

9 Claims, 10 Drawing Sheets

INFORMATION REPRODUCING APPARATUS FOR REPRODUCING INFORMATION BY MAGNETIC WALL MOVEMENT

BACKGROUND OF THE INVENTION

1. Field of the Invention

The present invention relates to an information reproducing apparatus for reproducing information recorded on a magneto-optical information recording medium, and more particularly an information reproducing apparatus utilizing a reproducing method by magnetic wall movement.

2. Related Background Art

In recent years, a high-density magneto-optical information recording medium, effecting information recording and reproduction utilizing a micro light spot, is attracting attention. In the magneto-optical medium, information is recorded in a thin magnetic film in the form of a magnetic domain as being vertical magnetization, utilizing thermal energy provided, for example, by a semiconductor laser, and the recorded information is reproduced by the magneto-optical effect. There is recently an increasing demand for increasing the recording density of such a magneto-optical recording medium. In general, the linear recording density of an optical disk, such as the magneto-optical recording medium, is determined by the wavelength of the laser light of the reproducing optical system and the NA (numerical aperture) of the objective lens. More specifically, as the diameter of the light spot is determined by the wavelength $\lambda$ of the laser light of the reproducing optical system and the NA of the objective lens, the dimension of the reproducible magnetic domain is approximately limited by $\lambda/2NA$.

Consequently, for achieving a higher density in the conventional optical disk, it is required to shorten the wavelength of the laser light of the reproducing optical system or to increase the NA of the objective lens. However, there are inevitably limits in such improvements in the wavelength of the laser light and in the NA of the objective lens. For this reason, there have been developed technologies for improving the recording density, by incorporating new technical aspects in the structure of the recording medium or in the reading method. For example, Japanese Patent Laid-open Application No. 3-93058 proposes a technology for reproducing a signal, recorded in a recording holding layer of a multi-layered film containing the recording holding layer and a magnetically coupled reproducing layer, by heating the reproducing layer, after alignment of the direction of magnetization, by laser irradiation and reading the signal recorded in the recording holding layer while it is transferred to the heated area of the reproducing layer. In this method, in comparison with the diameter of the reproducing light spot, the area heated to the signal transfer temperature by such a light spot thereby contributing to the signal detection can be made smaller, so that the intersymbol interference at the signal reproduction is reduced and a magnetic domain of a size smaller than the diffraction limit of light can be reproduced. This method is, however, incapable of providing a sufficient signal-to-noise ratio, because the effective signal detection area becomes smaller than the diameter of the reproducing light spot, whereby the amplitude of the reproduced signal is significantly decreased.

Figure 1A:
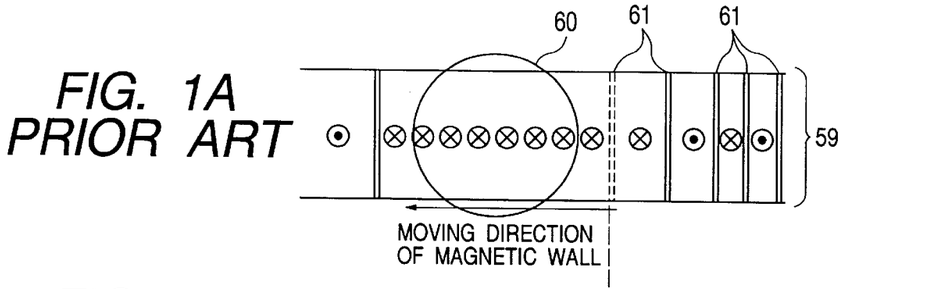
FIGS. 1A, 1B, 1C and 1D are views showing a conventional information reproducing method by magnetic wall movement.
Figure 1B:
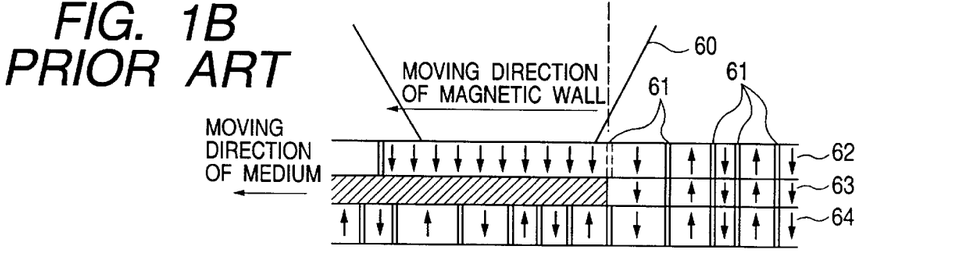

Also, Japanese Patent Laid-open Application No. 6-290496 proposes a reproducing method of the magnetic wall movement type, by irradiating a magneto-optical recording medium, composed of plural laminated magnetic layers, with a light spot thereby transferring the magnetic domain recorded as the vertical magnetization in a recording layer to a reproducing layer, and moving the magnetic wall of the magnetic domain thus transferred to the reproducing layer so as to enlarge the magnetic domain in comparison with that in the recording layer. Such a magnetic wall movement type reproducing method will be explained further in the following. FIGS. 1A to 1D are schematic views showing the magneto-optical recording medium to be employed in such a reproducing method. FIG. 1A is a schematic plan view of the magneto-optical recording medium, and FIG. 1B is a schematic cross-sectional view thereof. In these drawings, there are shown a light spot 60 for information reproduction, and an information track 59 on the magneto-optical recording medium. The recording medium is composed of three magnetic layers, namely first, second and third magnetic layers 62, 63, 64. Arrows in these layers indicate the directions of atomic spins, and magnetic walls 61 are formed at the boundaries of the areas in which the directions of atomic spin are mutually opposite.

Figure 1C:
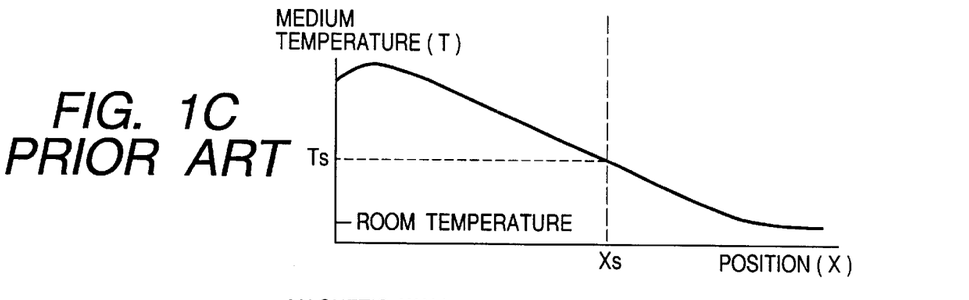
Figure 1D:
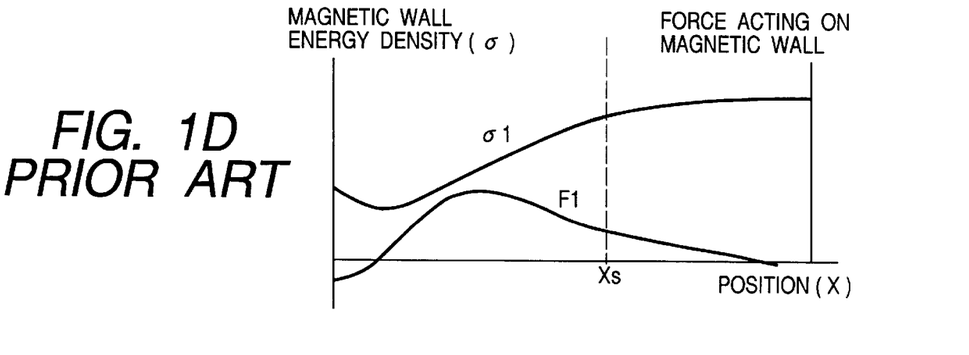

FIG. 1C is a chart showing the temperature distribution formed on the magneto-optical recording medium. Such a temperature distribution may be induced on the medium by the light beam itself, irradiated for reproducing the information, or by another heating means which raises the temperature of the medium in front of the spot of the reproducing light beam, so as to form a temperature peak behind such a light spot. It is assumed that the temperature of the medium at a position Xs is at a temperature Ts close to the Curie temperature of the second magnetic layer 63. FIG. 1D shows the distribution of the magnetic wall energy density σ1 of the first magnetic layer 62 corresponding to the temperature distribution shown in FIG. 1C. A slope of the magnetic wall energy density σ1 in the X-direction as shown in FIG. 1D generates a force F1 applied to the magnetic wall in the magnetic layers at the position X, and such a force F1 functions in such a manner as to displace the magnetic walls in a direction toward the lower side of the magnetic wall energy. In the first magnetic layer 62, where magnetic wall coercivity is small and the mobility thereof is high, the magnetic wall in this layer moves easily by such a force F1 if the layer is singly present. However, since the medium temperature is lower than Ts in an area in front of the position Xs (right-hand side in FIG. 1B), the magnetic wall in the first layer 61 becomes fixed at a position corresponding to the position of the magnetic wall in the third magnetic layer 64, by the exchange coupling with the third magnetic layer 64 with a larger magnetic wall coercivity.

If one of the magnetic walls 61 is at the position Xs as shown in FIG. 1B, the exchange coupling between the first magnetic layer 62 and the third magnetic layer 64 is cut off when the medium temperature rises to the temperature Ts close to the Curie temperature of the second magnetic layer 63. As a result, the magnetic wall 61 in the first magnetic layer 62 instantaneously moves, as indicated by an arrow, to an area where the temperature is higher and the magnetic wall energy density is lower. Thus, with the passing of the reproducing light spot 60, the magnetic wall moves as explained above and the atomic spins of the first magnetic layer 62 within the reproducing light spot are all aligned in the same direction. Then, with the movement of the medium, the magnetic wall 61 instantaneously moves and the atomic spins within the light spot are inverted and aligned in the same direction. As a result, the signal reproduced by the light spot always provides a constant amplitude regardless of the magnitude of the magnetic domain recorded in the third magnetic layer 64, whereby there can be avoided the interference of waveforms resulting from the optical limit of diffraction. Consequently, it is rendered possible to reproduce a pit which is smaller than λ/2NA representing the resolution limit determined by the wavelength λ of the laser light and the numerical aperture NA of the objective lens, thereby increasing the recording density.

Figure 2:
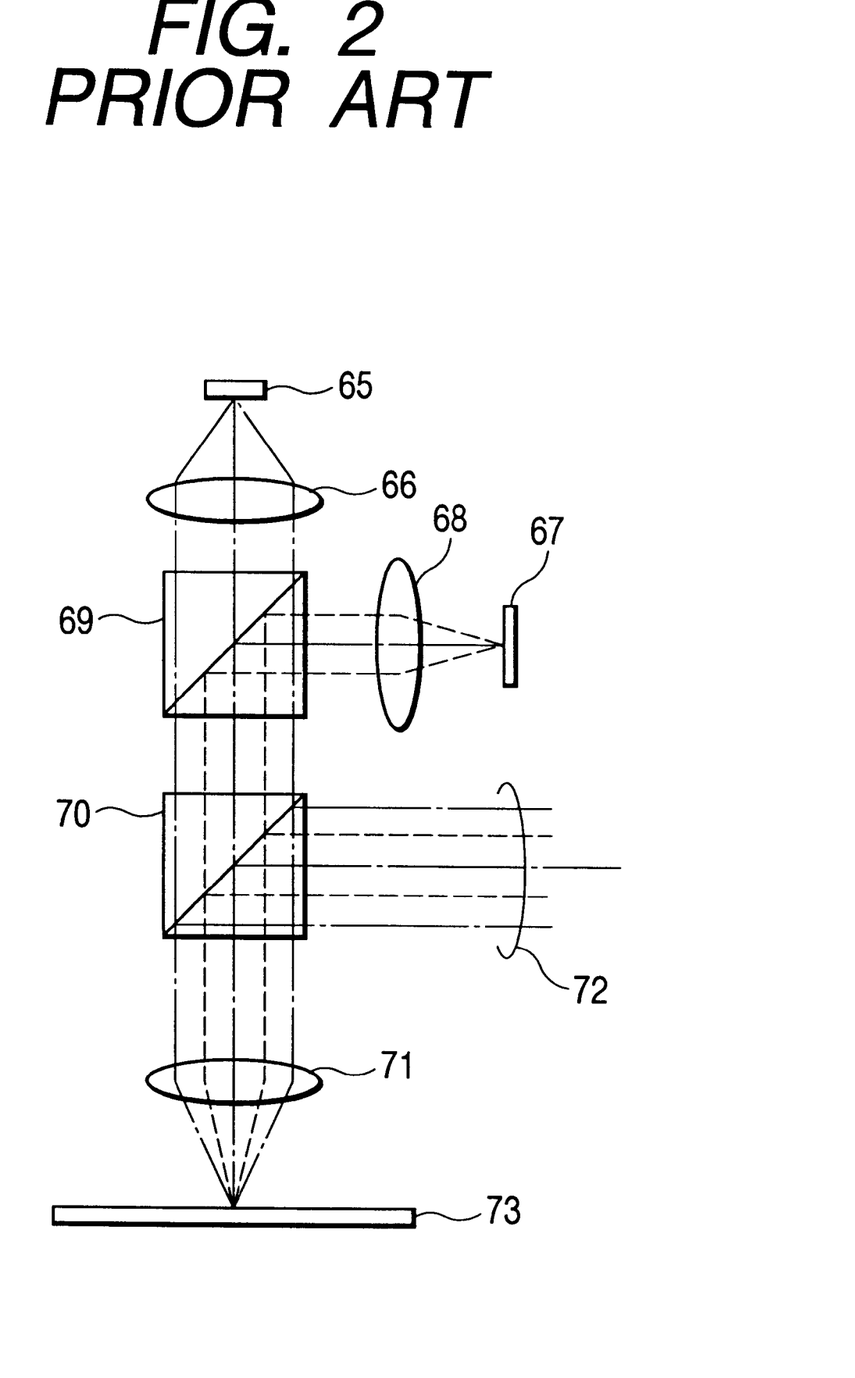
FIG. 2 is a view showing an optical system employed in the conventional magnetic wall movement type information reproducing method.

FIG. 2 is a schematic view of an information recording/reproducing apparatus to be employed for reproducing information by magnetic wall movement. In FIG. 2, a semiconductor laser 65 for information recording and reproduction has a wavelength, for example, of 780 nm. A heating semiconductor laser 67 has a wavelength, for example, of 1.3 μm. Both lasers are so positioned that the lights thereof enter the recording medium in a P-polarized state. In general, the laser beam emitted from a semiconductor laser has an oval cross section, and such a laser beam has been shaped as a circular light spot on the recording medium, utilizing, for example, a beam shaping prism and a substantially circular aperture. The laser beams emitted from the semiconductor lasers 65, 67 are shaped into beams of substantially circular cross sections by unrepresented beam shaping means, and are, respectively, converted into parallel light beams by collimating lenses 66, 68.

There are also provided a dichroic mirror 69, which is so designed as to transmit 100% of the light of 680 nm and to reflect 100% of the light of 1.3 μm, and a polarizing beam splitter 70, which is so designed as to transmit 70 to 80% of the P-polarized light and to reflect almost 100% of the S-polarized light, which is perpendicular to the P-polarized light. The parallel light beams obtained by conversion by the collimating lenses 66, 68 enter an objective lens 71 through the dichroic mirror 69 and the polarizing beam splitter 70 in such a manner that the light beam of 780 nm occupies a larger area in the aperture of the objective lens 71 while the light beam of 1.3 μm occupies a smaller area in the aperture. Consequently, even with the same objective lens 71, the numerical aperture of the lens acts weaker on the light beam of 1.3 μm, whereby the light spot of 1.3 μm becomes larger than that of 780 nm on the recording medium 73. The light beams reflected from the recording medium are again formed by the objective lens 71 into parallel light beams, which are reflected by the polarizing beam splitter 70 as light beams 72. The light beams 72 enter an unrepresented optical system, then separate by wavelength, and regenerate a servo error signal and a reproduced information signal.

Figure 3A:
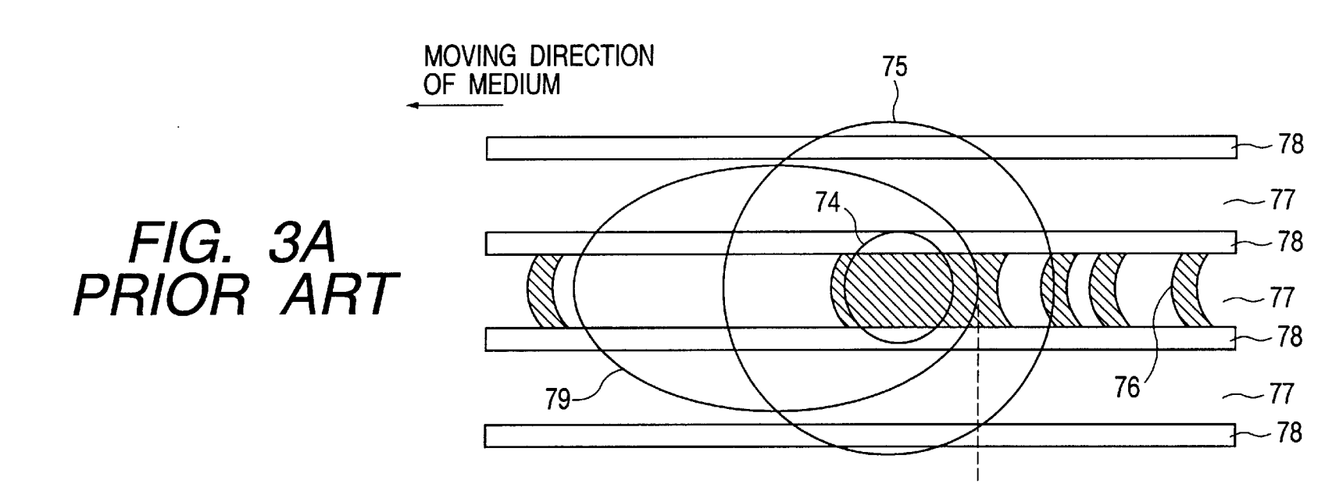
FIGS. 3A and 3B are views showing the positional relationship of the two light spots formed by the optical system shown in FIG. 2 and the temperature distribution on the recording medium.
Figure 3B:
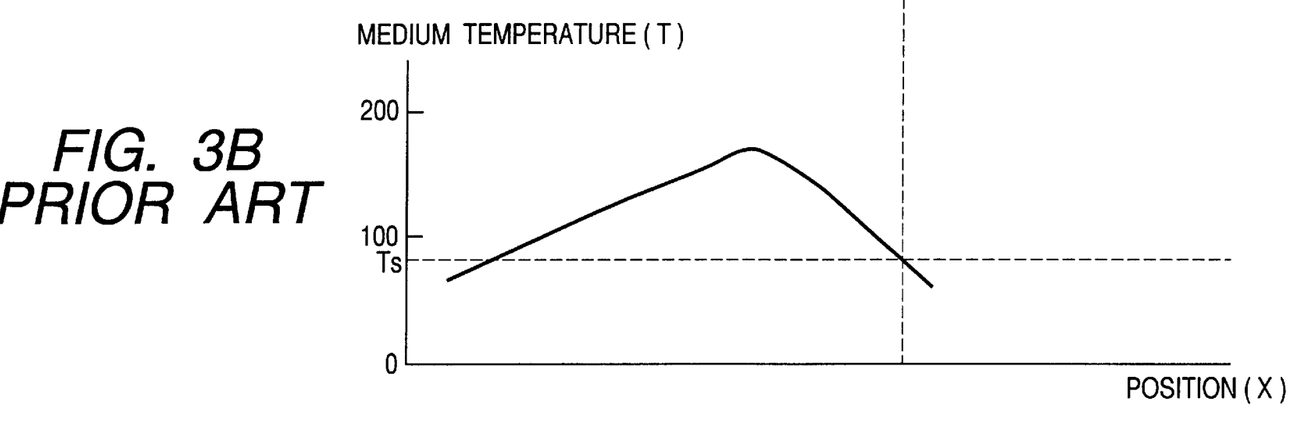

In the following, there will be explained, with reference to FIGS. 3A and 3B, the relationship between the recording-reproducing light spot and the heating light spot on the recording medium in the apparatus shown in FIG. 2. In FIG. 3A, there are shown a recording-reproducing light spot 74 of a wavelength of 780 nm, a heating light spot 75 of a wavelength of 1.3 μm, a magnetic wall 76 of a magnetic domain recorded on a land 77, a groove 78, and an area 79 in which the temperature is raised by the heating light spot 75. A sloped temperature distribution as shown in FIG. 3B can be formed on the moving recording medium, by coupling the recording-reproducing light spot 74 and the heating light spot 75 on the land 77 between the grooves 78, and the formation of such a sloped temperature distribution provides the ability to execute the reproduction by magnetic wall movement as explained in relation to FIGS. 1A to 1D.

On the other hand, a method of utilizing an oval-shaped light spot for reproducing the information is disclosed, for example, in Japanese Patent Laid-open Application No. 8-180492. In this method, there is formed an oval-shaped light spot on the optical disk, without the optical system for converting the condensed light spot into a circular form, in such a manner that the direction of a longer axis coincides with the direction of the track. Consequently, there can be achieved effects of dispensing with the optical system for converting the light spot into a circular form, thereby enabling inexpensive manufacture of the optical head, and reducing the size of the light spot in the direction perpendicular to the track, thereby suppressing the influence of crosstalk noise and disk noise resulting from the shape of the groove.

Also, Japanese Patent Laid-open Application No. 5-94624 discloses a method of information reproduction by forming ultra-resolution light spots with an optical filter, irradiating plural marks with the oval-shaped main light spot and detecting the interference pattern from such plural marks.

In the above-mentioned conventional information reproducing methods by magnetic wall movement, the shape of the recording-reproducing light spot is not optimized, and there are margins for improvement in the signal-to-noise ratio and for suppression of the leakage of the information signal from the neighboring tracks.

Also, in the conventional method of the above-mentioned Japanese Patent Laid-open Application No. 8-180492 utilizing the oval-shaped light spot for reproducing the information, since reproduction of information by magnetic wall movement is not utilized, the resolving power in the direction of a track is deteriorated if the longer axis of the oval-shaped light spot becomes larger, whereby the signal-to-noise (C/N) ratio becomes lower. For this reason, the ratio of the longer axis/shorter axis of the oval-shaped light spot is optimally within a range of 1.1 to 1.3. Also, it is described that the size of the light spot can be made smaller in the direction perpendicular to the track, but, as long as the numerical aperture of the objective lens remains the same as in the prior art, the size of the light spot remains unchanged in the direction perpendicular to the track, but becomes smaller only in the direction along the track. Consequently, an appreciable decrease of the crosstalk cannot be expected for the smallest mark (on the order of ⅓ to ½ of the light spot) employed in the conventional recording-reproducing method.

Furthermore, the above-mentioned Japanese Patent Laid-open Application No. 5-94624, utilizing the ultra-resolution light spot prepared with the optical filter, does not describe the reproduction of information by magnetic wall movement nor the crosstalk.

SUMMARY OF THE INVENTION

The object of the present invention is to provide an information reproducing apparatus capable, in the magnetic wall movement type reproducing method, of improving the signal-to-noise ratio and also improving the crosstalk from the neighboring tracks.

The above-mentioned object can be attained, according to the present invention, by an information reproducing apparatus for reproducing information by moving the magnetic wall along an information track on the information recording medium, comprising:

an optical system for irradiating the recording medium with a light spot of an oval shape of which a longer axis is substantially parallel to the information track; and movement means for causing a relative movement between the light spot and the recording medium.

The present invention will be clarified further by the following embodiments.

DETAILED DESCRIPTION OF THE PREFERRED EMBODIMENTS

Figure 4:
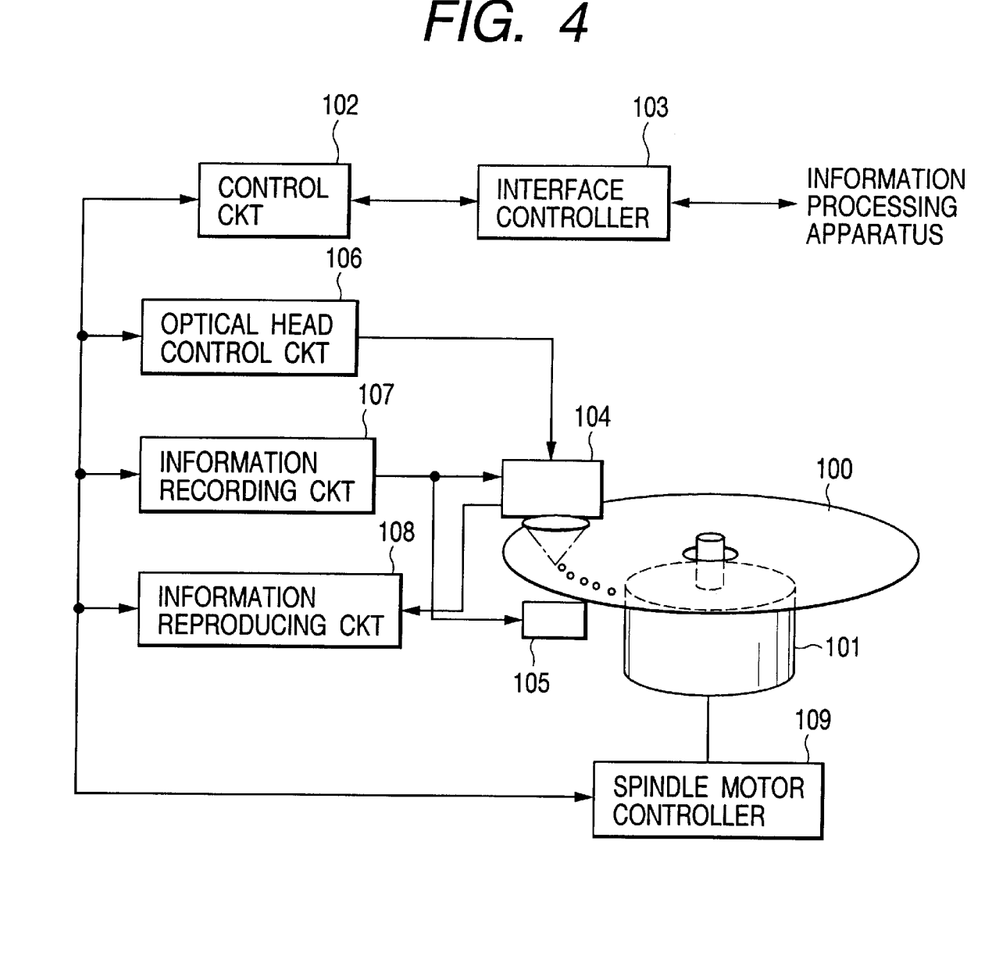
FIG. 4 is a block diagram showing an embodiment of the magneto-optical information reproducing apparatus of the present invention.

Now, the present invention will be clarified in detail by embodiments thereof, with reference to the attached drawings. FIG. 4 shows the configuration of an embodiment of the present invention, wherein a disk-shaped magneto-optical recording medium 100, for recording and reproducing information, is rotated at a predetermined velocity by a spindle motor 101. The magneto-optical recording medium 100 is provided with three magnetic layers as explained in relation to FIGS. 1A to 1D, and the recorded information is reproduced by the magnetic wall movement method. A control circuit 102, for controlling various units of the apparatus, is connected to an external information processing apparatus such as a computer, through an interface controller 103. The control circuit 102 controls the information exchange with the information processing apparatus, and also controls the information recording and reproducing operations to and from the magneto-optical recording medium 100.

An optical head 104 serves to record and reproduce the information by irradiating the magneto-optical recording medium 100 with a light beam. The optical head 104 is composed of semiconductor lasers, an objective lens for condensing the laser beams, a photodetector for detecting the light reflected from the recording medium, etc. As will be explained later in more detail, the optical head 104 irradiates the information track with a heating light spot and a reproducing light spot, or with a reproducing light spot, in an oval form, of which a longer axis is parallel to the information track. A magnetic head 105 is positioned opposite to the optical head 104 across the magneto-optical recording medium 100, and applies a magnetic field thereto. An optical head control circuit 106 serves to control the position of the optical head 104 and the position of the light beams irradiating the magneto-optical recording medium 100 from the optical head 104. More specifically, the optical head control circuit 106 executes movement of the optical head 104 in the radial direction of the magneto-optical recording medium 100 thereby making access to the desired track, also focus control for focusing the light beam from the optical head 104 onto the medium surface of the rotating magneto-optical recording medium 100, and tracking control in such a manner that the light beam from the optical head 104 follows the information track.

An information recording circuit 107 serves to record the information on the magneto-optical recording medium 100 according to the control of the control circuit 102, and an information reproducing circuit 108 serves to reproduce the recorded information of the magneto-optical recording medium 100, based on a readout signal from the optical head 104. In response to a recording command from the information processing apparatus, the control circuit 102 controls the various units thereby moving the optical head 104 to the desired information track, and transfers the information signal, transmitted from the information processing apparatus, to the information recording circuit 107. The information recording circuit 107 modulates the information signal, drives the magnetic head 105 by the thus modulated signal and supplies the semiconductor laser in the optical head 104 with a constant recording drive current or a drive current of a fixed frequency. The information is thus recorded on the information track of the magneto-optical recording medium 100, by the application of the magnetic field modulated according to the information signal, under the irradiation with the light beam of a constant intensity. As an alternative, the information recording may also be achieved by the irradiation with a light beam modulated according to the information signal, under the application of a magnetic field of a constant direction from the magnetic head.

On the other hand, if a reproducing command is given from the information processing apparatus, the control circuit 102 controls the various units of the apparatus to move the optical head 104 to the desired information track. The control circuit 102 also controls the information recording circuit 107 to supply the semiconductor laser of the optical head 104 with a constant reproducing drive current, whereby the information track of the magneto-optical recording medium 100 is scanned by the light beam from the optical head 104. The optical head 104 also detects the light reflected from the magneto-optical recording medium 100, and the information reproducing circuit 108 reproduces the recorded information, based on the thus obtained readout signal. The reproduced data are transferred, through the interface controller 103, to the external information processing apparatus, under the control of the control circuit 102.

Figure 5:
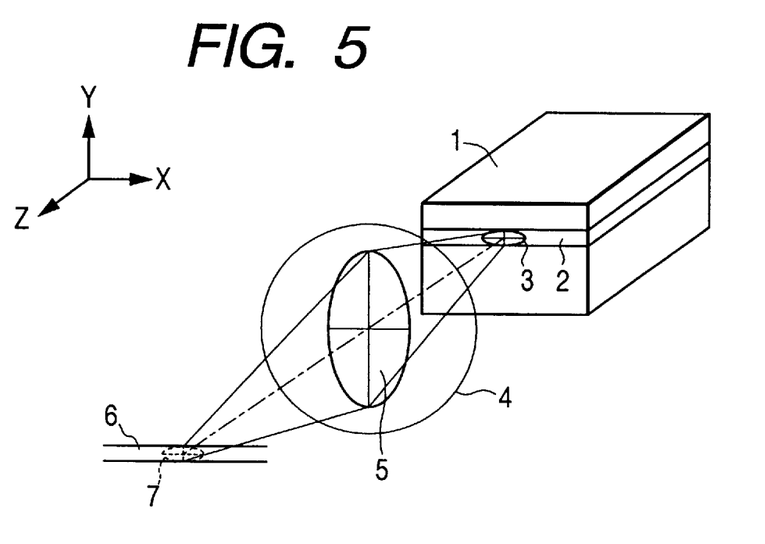
FIG. 5 is a perspective view showing the principle of formation of the oval light spot in the embodiment shown in FIG. 4.

FIG. 5 shows the configuration of the optical system in the optical head 104. FIG. 5 shows the principle of formation of the light spot of the aforementioned oval shape, and the detailed configuration is omitted for the purpose of clarity. In FIG. 5, there are shown a semiconductor laser 1 serving as a light source provided in the optical head; an active layer 2 of the semiconductor laser; and a cross-sectional shape 3 of the laser beam emitted from the active layer 3. Immediately after the emission from the semiconductor laser 1, the laser beam has an oval cross-sectional shape, of which the longer axis is parallel to the X-axis (direction of the track). The laser beam diverging from the semiconductor laser 1 proceeds along the Z-axis and enters an objective lens 4, positioned at a far field in the optical head 104. Reference numeral 5 indicates the shape of the beam on the far field. In FIG. 5, the light spot irradiates an information track positioned on the X-Y plane.

The beam 5 on the far field has an oval shape having the longer axis parallel to the Y-axis in FIG. 5. The configuration shown in FIG. 5 does not employ the conventional beam shaping, utilizing the beam shaping prism or the substantially circular aperture. There are also shown an information track 6 on the recording medium, and a light spot 7 on the information track. The information track 6 is parallel to the X-axis. In the configuration shown in FIG. 5, because of the absence of the beam shaping as explained above, the light spot 7 on the information track 6 becomes an oval shape having the longer axis parallel to the X-axis. On the other hand, the light spot in the conventional optical memories is mostly circular.

Figure 14:
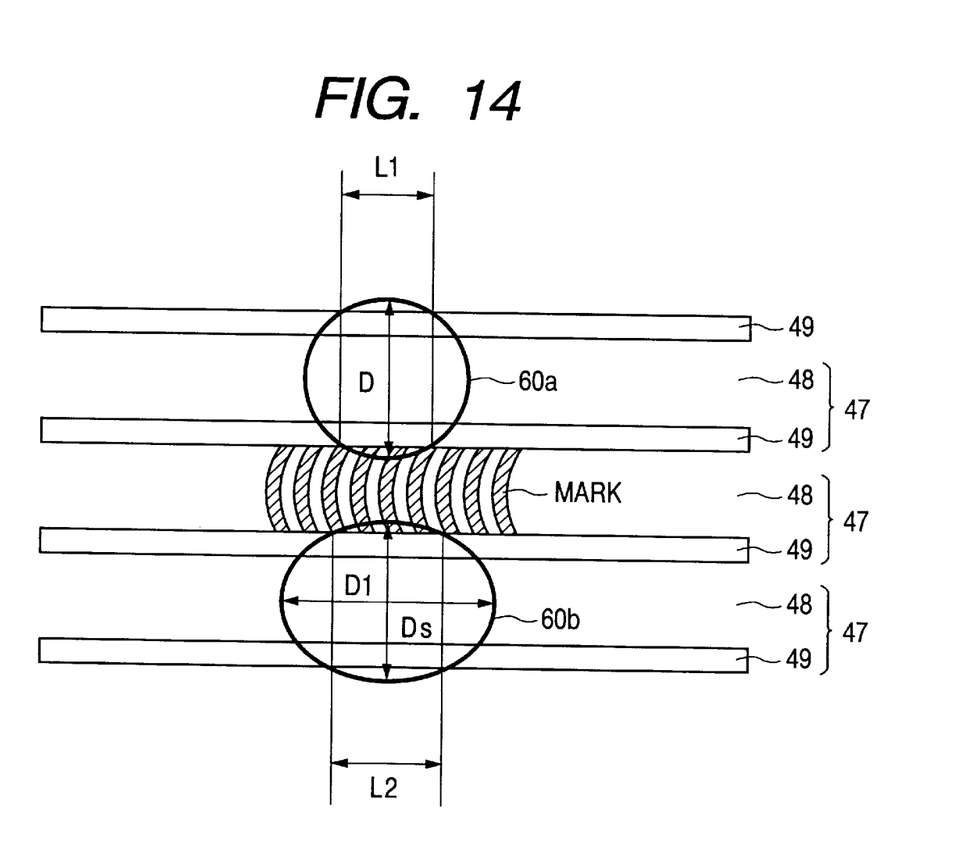
FIG. 14 is a view showing the effect of the present invention.

In the following, there will be explained, with reference to FIG. 14, the effects obtainable by utilizing the oval-sectioned light beam in the magnetic wall movement type information reproducing method.

There are shown an information track 47, a land portion 48, groove portions 49, a conventional circular light spot 60a, and an oval-shaped light spot 60b of the present invention shown in FIG. 5. D indicates the size of the circular light spot, while D1 and Ds respectively indicate the sizes of the longer and shorter axes of the oval light spot. For a given objective lens, Ds is substantially the same as D. In this example, D is assumed to be about 1.2 $\mu$m. Also, D1 is assumed to be about 1.56 $\mu$m. The ratio of the longer axis/shorter axis is about 1.3.

MARK indicates a mark recorded by the magnetic field modulation method. The reproducing by magnetic wall movement is, in principle, capable of reproducing the mark approximately down to the size of the magnetic wall. In the illustrated example, the size of the mark in the direction of a track is assumed to be about 0.1 $\mu$m.

L1 and L2 indicate the information leaking ranges from the neighboring tracks, respectively, in the case of the circular light spot 60a and the oval light spot 60b. In the case of the circular light spot 60a, the information leaks from about six areas (each of the hatched and white areas being counted as one area), while the information leaks from about eight areas in the case of the oval light spot 60b.

Since the signals leak from a larger number of marks in the case of the oval light spot, in comparison with the case of the circular light spot, the leaking signals are averaged and the influence of crosstalk is reduced. Also, in the magnetic wall movement type information reproducing method, the movement of the magnetic wall does not take place because the temperature is not sufficiently elevated in such a signal leaking range (temperature distribution being so adjusted in advance as to meet such a requirement). Consequently, the level of the leaking signal component is very small in comparison with the signal component resulting from the information to be detected, so that the signal-to-noise ratio is significantly improved, in combination with the above-mentioned averaging effect for the leaking signals. Even if the movement of the magnetic wall takes place in the aforementioned signal leaking range, plural magnetic walls move at the same time toward the center of the heating light spot 79, so that the merit of the signal averaging can still be obtained. The longer axis/shorter axis ratio is preferably larger because the above-mentioned effect is enhanced.

In the conventional optical memories, the reproducing light spot is generally circular. Even if an oval light spot is employed, the longer axis thereof is generally directed perpendicular to the information track. This is because, in the conventional reproducing methods, the resolving power in the direction of the linear density is lowered if the oval-shaped light spot is positioned parallel to the information track. An oval light spot is employed in a special case of the conventional methods as explained in the prior art, but the longer axis/shorter axis ratio is limited within a range of 1.1 to 1.3 in consideration of the resolving power in the direction of linear density.

In contrast, in the magnetic wall movement type information reproducing method, the resolving power in the direction of the linear density need not be considered because the mark is not fixed, and the longer axis/shorter axis ratio is desirably larger, depending on the efficiency of utilization of the light from the light source, and is preferably equal to or larger than 1.4. As explained in the foregoing, a larger ratio of longer axis/shorter axis is preferable for improving the signal-to-noise ratio.

On the other hand, in a combination of the conventional information reproducing method and the oval-shaped light spot, the level of the leading signal component resulting from crosstalk is close to the level of the signal component based on the information to be detected, because the mark position is fixed, so that a larger ratio of longer axis/shorter axis increases the signal leaking from the neighboring tracks, thereby deteriorating the signal-to-noise ratio.

In such an information reproducing method by magnetic wall movement, the size of the light spot in the direction perpendicular to the information track (direction of the Y-axis in FIG. 2) is preferably on the order of the width of the information track. An excessively large size of the light spot in the Y-direction increases the information leaking from the neighboring tracks, while an excessively small size of the light spot detrimentally affects the precision of tracking control.

The configuration shown in FIG. 5 forms the oval-shaped light spot on the recording medium, utilizing the laser beam diverging with an oval cross section, thereby dispensing with the beam shaping prism and the circular aperture employed in the conventional configuration, thus achieving a decrease in the number of component parts and a reduction in the cost. The irradiation with such an oval-shaped light spot provides the advantages of improving the signal-to-noise ratio of the reproduced signal, reducing the information leakage from the neighboring tracks and simplifying the structure of the optical system.

Figure 6:
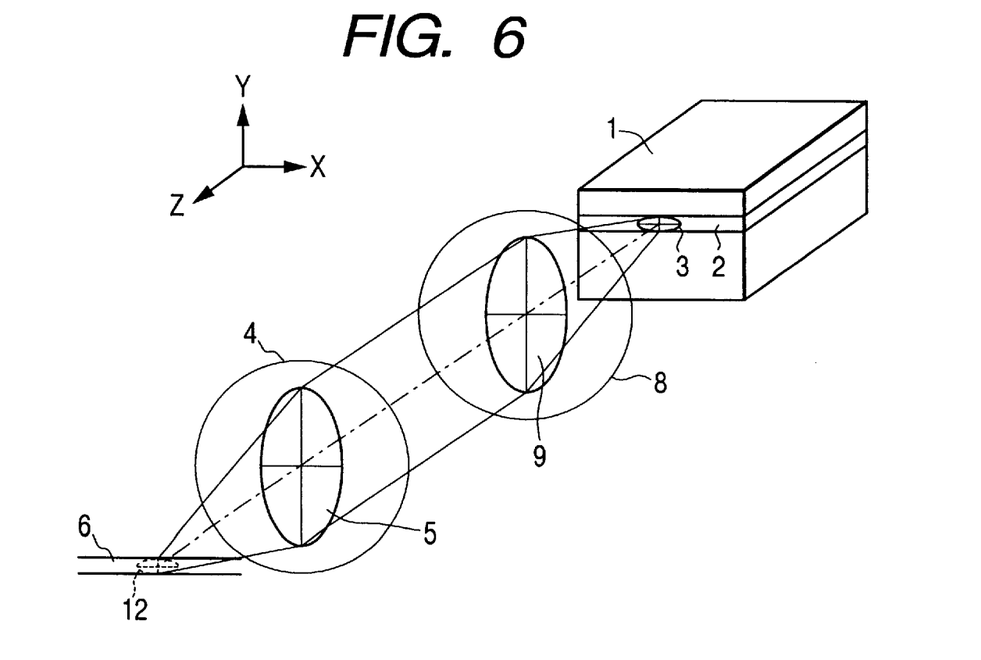
FIG. 6 is a perspective view showing another principle of formation of the oval light spot in the embodiment shown in FIG. 4.

FIG. 6 shows another principle of forming the oval-shaped light spot. In contrast to a finite system shown in FIG. 5, FIG. 6 shows an infinite system. In FIG. 6, components the same as those in FIG. 5 are represented by the same numerals. In FIG. 6, the semiconductor laser 1 is the same as that in FIG. 5, and the laser beam emerging from the active layer 2 has an oval cross section 3. The laser beam from the semiconductor laser 1 enters a collimating lens 8, which provides a parallel light beam in the distribution 9 on the far field. The parallel light beam with the oval cross section proceeds to an objective lens 4 and is focused thereby into a light spot 12 on the magneto-optical recording medium. The longer axis of the oval light spot 12 is parallel to the information track 6 (X-direction), as in the case of FIG. 5.

Figure 7:
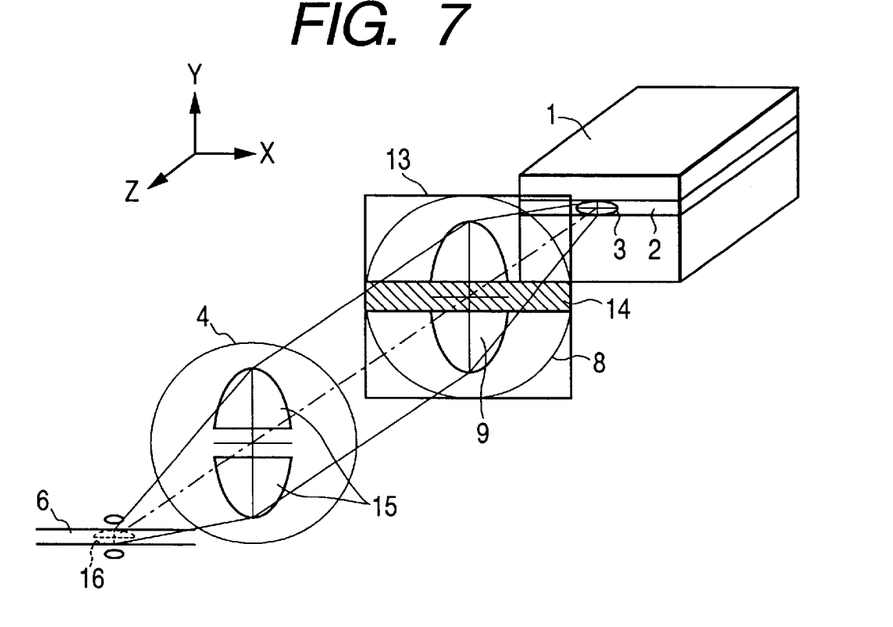
FIG. 7 is a perspective view showing still another principle of formation of the oval light spot in the embodiment shown in FIG. 4.

FIG. 7 shows still another principle for forming the oval-shaped light spot, wherein components the same as those in FIG. 5 are again represented by the same numerals. In the configuration shown in FIG. 7, one-dimensional ultra-resolution light spots are optically formed to positively construct an oval-shaped light spot. In comparison with the configurations shown in FIGS. 5 and 6, the configuration shown in FIG. 7 can form a light spot with a larger oval ratio, thereby further improving the signal-to-noise ratio of the reproduced signal. More specifically, the configuration shown in FIG. 7 is provided with an optical filter 13, in the infinite optical system shown in FIG. 6. The optical filter 13, for forming the one-dimensional ultra-resolution spots, has an opaque band, indicated by a hatched portion 14. As alternatives, the optical filter 13 may be of a phase type or of a configuration utilizing a prism. The laser beam from the semiconductor laser 1 is converted by the optical filter 13 into a parallel light beam 9, which is partially eliminated by the opaque band 14 to provide a distribution 15 on the objective lens 4. The objective lens 4 condenses the incident light beam onto the magneto-optical recording medium, thereby forming a light spot of a shape 16.

Figure 8A:
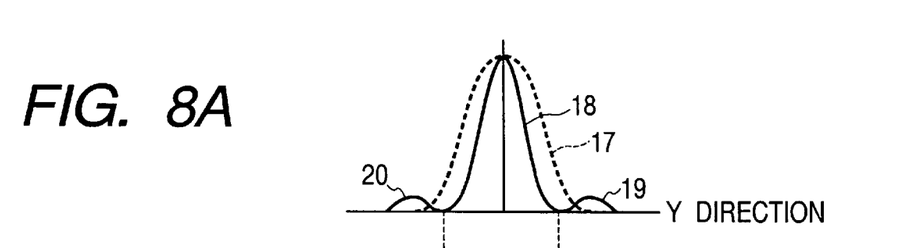
FIGS. 8A and 8B are views showing the intensity distribution of the oval light spot shown in FIG. 7 and the shape thereof on the magneto-optical recording medium.
Figure 8B:
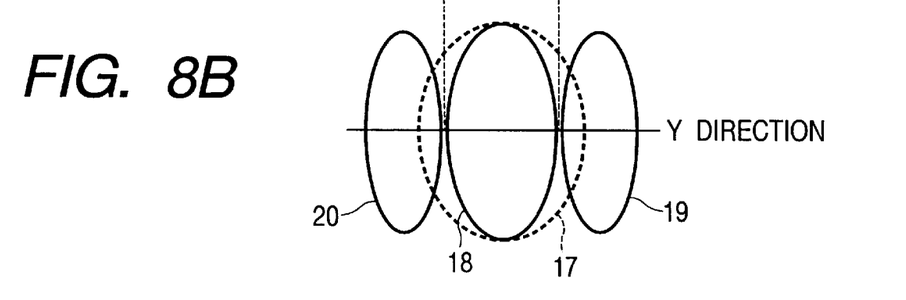

In the following, there will be explained the shape of the light spot 16 with reference to FIGS. 8A and 8B, which respectively indicate the intensity distribution of the light spot 16 along the Y-axis and the corresponding distribution on the recording medium. In these charts, broken lines 17 indicate the intensity distribution and the cross-sectional shape of the light spot on the recording medium, in the case of the configuration shown in FIG. 5 or 6. On the other hand, solid lines 18, 19, 20 indicate the intensity distribution and the spot shape on the recording medium in the case of the ultra-resolution spot configuration. As will be apparent from these charts, the oval ratio of the main spot 18 in the ultra-resolution spot configuration is larger than that of the oval-shaped light spot 17. The side spots 19, 20 are unnecessary and are to be eliminated in the information reproducing optical system (not shown). Consequently, the reproduction of information by the magnetic wall movement method as explained in FIGS. 1A to 1D, 2, 3A and 3B utilizing such a main spot 18 provides the ability to select the size of the light spot in the Y-direction substantially equal to the width of the information track, owing to the larger oval ratio of the light spot, and to achieve further improvements in the signal-to-noise ratio and in the information leakage from the neighboring tracks in comparison with the configurations shown in FIGS. 5 and 6, because of the larger dimension of the light spot in the X-direction than in the above-mentioned configurations.

Figure 9:
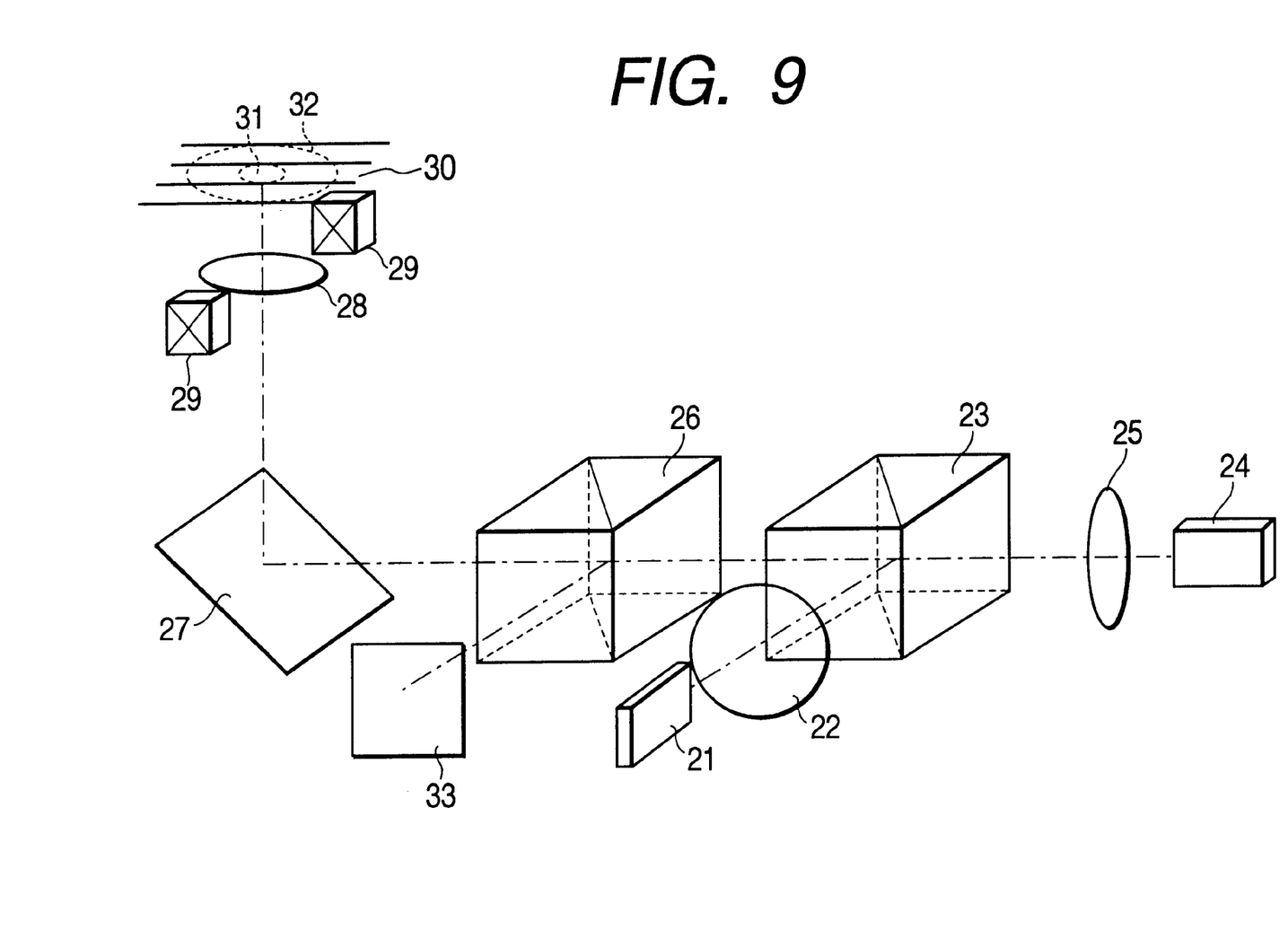
FIG. 9 is a perspective view showing the specific configuration of an optical system for forming the oval light spot according to the principle shown in FIG. 6.

FIG. 9 is a perspective view showing the specific configuration of the infinite optical system shown in FIG. 6. FIG. 9 shows a case of employing oval-shaped light spots for heating and for reproduction of information. In FIG. 9, there are provided a heating semiconductor laser 21 of a wavelength, for example, of 780 nm, and a reproducing (recording) semiconductor laser 24 of a wavelength, for example, of 1.3 μm. The oval-sectioned laser beams emerging from these semiconductor lasers are converted by collimating lenses 22, 25 into parallel light beams of an oval cross section, without the use of a beam shaping prism or a circular aperture, in such a manner that they are both linearly polarized in the same direction. There are also provided a dichroic mirror 23 which is so designed as to transmit the light with a wavelength of 870 nm by 100% and to reflect the light with a wavelength of 1.3 μm by 100%, and a polarizing beam splitter 26 which transmits the linearly polarized lights from the semiconductor lasers 21, 24 by 70–80% and reflects linearly polarized light whose polarization direction is orthogonal to that of said polarized light by approximately 100%.

The parallel light beams formed in the collimating lenses 22, 25 are transmitted by the dichroic mirror 23 and the polarizing beam splitter 26, then deflected by an upward deflecting mirror 27 and enter an objective lens 28, in such a manner that the light beam with a wavelength of 780 nm occupies a larger area in the aperture of the objective lens 28 while the light beam with a wavelength of 1.3 μm occupies a smaller area in the aperture. Consequently, even with the same objective lens 28, the numerical aperture of the lens acts weaker on the light beam with a wavelength of 1.3 μm, whereby the light spot of the beam with a wavelength of 1.3 μm becomes larger than that of 780 nm on the recording medium 30. As a result, there are formed, on the recording medium, an oval-shaped reproducing light spot 31 and an oval-shaped heating light spot 32, in which the longer axes thereof are parallel to the information track on the recording medium. There is also provided a drive coil 29 for driving the objective lens for the purpose of focusing control and tracking control. The light beams reflected from the recording medium are again formed by the objective lens 28 into parallel light beams, which are reflected by the polarizing beam splitter 26 as light beams 33. The light beams 33 enter an unrepresented optical system, then have performed wavelength-separation, and generate a servo error signal and a reproduced information signal.

Figure 10:
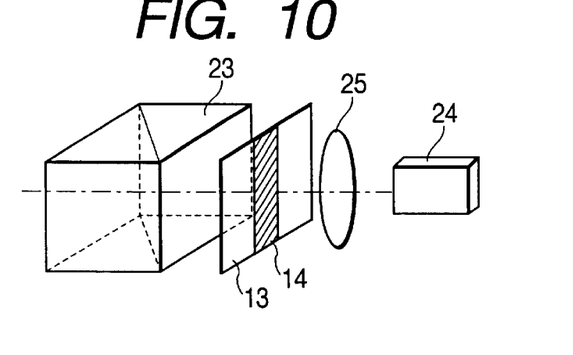
FIG. 10 is a perspective view showing the arrangement of an optical filter in the optical system for forming the oval light spot according to the principle shown in FIG. 7.

FIG. 10 shows the specific configuration of the optical system for forming the one-dimensional ultra-resolution spots with the optical filter, based on the principle shown in FIG. 7. FIG. 10 only shows the vicinity of the optical filter 13, and the remaining configuration is the same as in FIG. 9. The optical filter, having the opaque band, is positioned between the collimating lens 25 and the dichroic mirror 23, and the light spots of a high oval ratio are formed on the recording medium as already explained in FIGS. 7, 8A and 8B. The opaque band is directed parallel to the information track on the recording medium 30.

Figure 11:
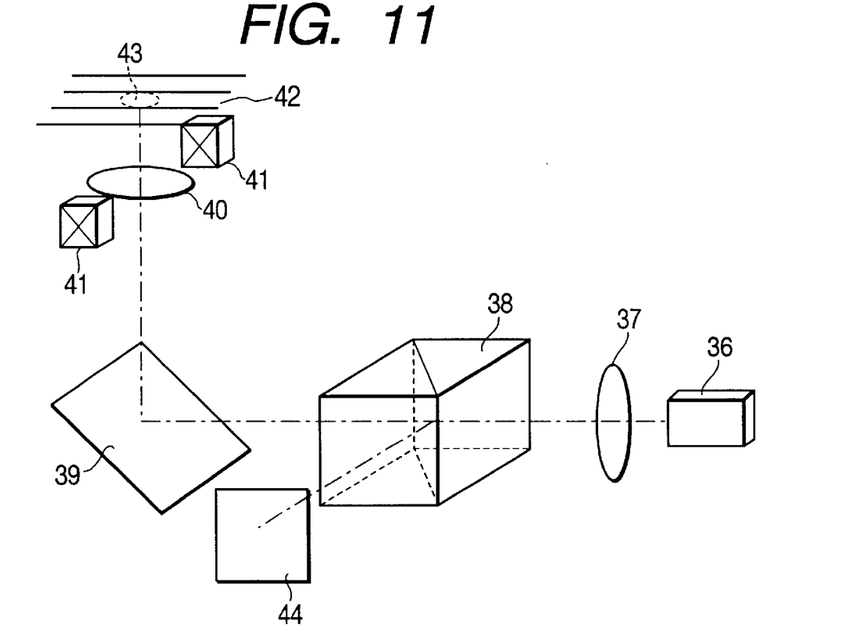
FIG. 11 is a perspective view showing the configuration of an optical system for forming the oval light spot for one-beam reproduction of information by magnetic wall movement.

In the following, there will be explained an optical system which forms the oval shape only in the reproducing light spot. Such an optical system is employed in the case of information reproduction by magnetic wall movement solely with the reproducing light spot, namely without the heating light spot. FIG. 11 shows the specific configuration of such an optical system, in which a linearly polarized light beam emerging from a semiconductor laser 36 constituting the light source is directly converted, without beam shaping, by a collimating lens 37 into a parallel light beam. Consequently, the laser beam has an oval cross section also in this case. A polarizing beam splitter 38 transmits the linearly polarized light from the semiconductor laser 36 by 70–80%, and reflects linearly polarized light whose polarization direction is orthogonal to that of said linearly polarized light by approximately 100%.

The parallel light beam from the semiconductor laser 36 is transmitted by the polarizing beam splitter 38, then deflected by an upward deflecting mirror 39 and enters an objective lens 40, which condenses the incident light beam to form an oval-shaped light spot 43 on the recording medium 42. The longer axis of the oval-shaped light spot is parallel to the information track on the recording medium 42. A drive coil 41 is provided for driving the objective lens 40, for the purpose of focusing control and tracking control. The light reflected from the recording medium 42 is again converted by the objective lens 40 into a parallel light beam, and is reflected by the polarizing beam splitter 38 as a light beam 44 which enters an unrepresented optical system and, after separation by wavelength, generates a servo error signal and a reproduced information signal.

Figure 12:
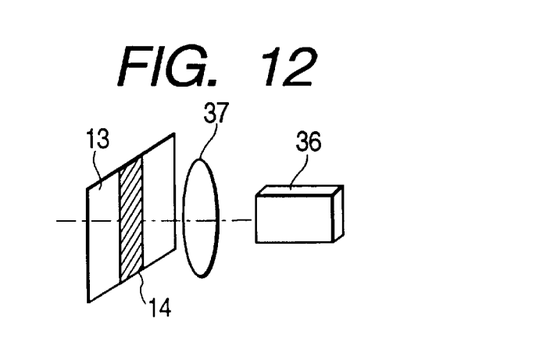
FIG. 12 is a perspective view showing the arrangement of an optical filter in the optical system for forming the ultra-resolution light spot with one beam.

Also, in the case of forming the one-dimensional ultra-resolution spots with a single beam, the optical filter 13 having the opaque band 14 may be positioned, as shown in FIG. 12, between the collimating lens 37 and the polarizing beam splitter 38. The opaque band 14 is directed parallel with respect to the information track on the magneto-optical recording medium. Other configurations are the same as those in FIG. 11. In the case of executing the reproduction of information by a magnetic wall movement method with the reproducing light spot only, an oval-shaped light spot can be formed by the optical system shown in FIG. 11 or 12 to obtain the aforementioned effects such as the improvement in the signal-to-noise ratio.

Figure 13A:
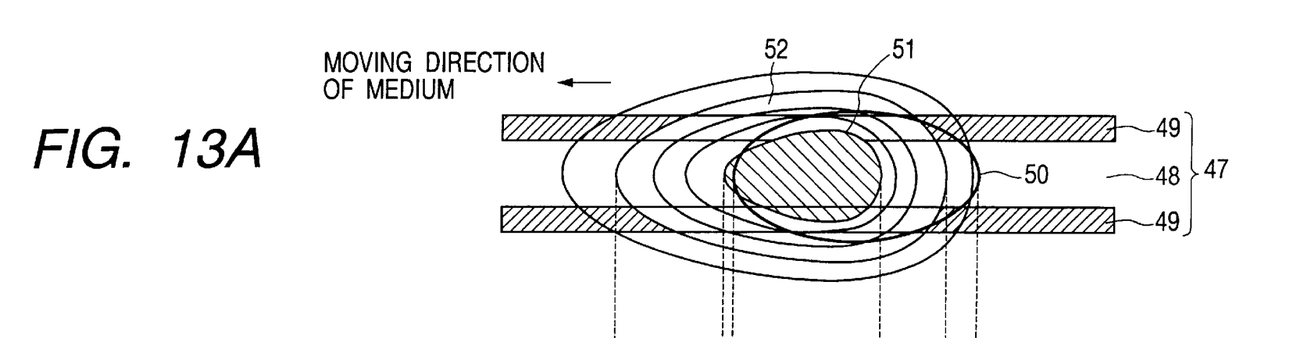
FIGS. 13A and 13B are views for explaining the method of reproduction by magnetic wall movement with one beam.
Figure 13B:
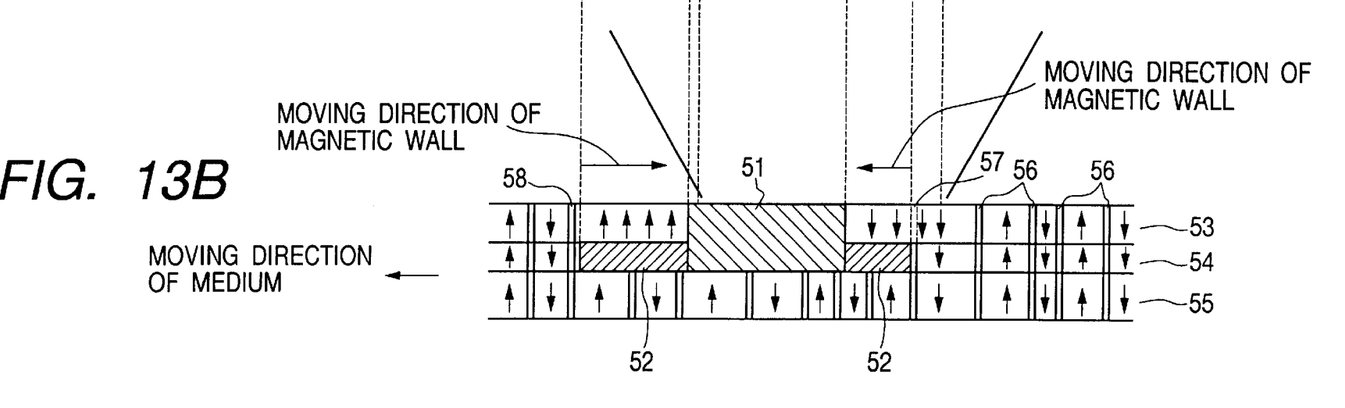

In the following, there will be explained the method of reproduction of information by magnetic wall movement method with a single beam, with reference to FIGS. 13A and 13B, which are, respectively, a plan view and a cross-sectional view of the magneto-optical recording medium under the irradiation with a light spot. In these drawings, there are shown an information track 47, a land 48 and grooves 49. The groove 49 serves to shield the influence of the magnetic wall movement from the adjacent information track, and such shielding may be achieved, for example, by forming the groove deeper than in the prior art, or by annealing the groove only to erase the magnetization. There is also shown an oval-shaped reproducing light spot 50 of a single beam, formed by the optical system shown in FIG. 11 or 12.

The irradiation of such an oval-shaped light spot 50 generates, on the magneto-optical recording medium, a temperature distribution as represented by egg-shaped isothermal lines. The recording medium moves in a direction indicated by an arrow. The magneto-optical recording medium is provided, as in the medium shown in FIGS. 1A to 1D, with three magnetic layers, namely first, second and third magnetic layers 53, 54, 55 shown in FIG. 13B, wherein the first magnetic layer 53 constitutes a reproduction layer, the second magnetic layer 54 constitutes an adjustment layer and the third magnetic layer 55 constitutes a recording layer. Arrows in these layers indicate the directions of the atomic spins. A magnetic wall such as 56 is formed at the boundary between the area where the directions of the atomic spin are mutually opposite.

An area 51 is a high-temperature area in which the first magnetic layer 53 is equal to or higher than the Curie temperature. For this reason, in such a high-temperature area 51, the first magnetic layer 53 loses the magnetization, and the magnetic wall movement does not take place in such a high-temperature area 51. An area 52 around the high-temperature area 51 constitutes a mid-temperature area, in which the second magnetic layer 54 is equal to or higher than the Curie temperature, but the first magnetic layer 53 is lower than the Curie temperature. When magnetic walls 57, 58 of a magnetic domain recorded in the third magnetic layer 55 reach the boundary between the low-temperature area and the mid-temperature area 52, the magnetic walls 57, 58, respectively, move to the left and to the right, toward the high-temperature area. In this state, the area 51 is enlarged by controlling the moving area of the magnetic wall 58 by the size of the high-temperature area 51, namely, by controlling the intensity of the light spot under the control of the drive current for the semiconductor laser. In this manner, the moving area of the magnetic wall 58 can be displaced outside the irradiation area of the light spot 50 contributing to the reproduction of information, whereby the signal leaking resulting from the movement of the magnetic wall 58 can be eliminated and the magnetic wall 57 alone can be selectively reproduced. The reproduction of information by the magnetic wall movement method with a single beam can be realized by such control.

According to the present invention, as explained in the foregoing, the reproduction of information by the magnetic wall movement method is executed by the irradiation with an oval-shaped light spot of which a longer axis is parallel to the information track, thereby providing advantages of improving the signal-to-noise ratio of the reproduced signal, reducing the signal leakage from the adjacent information tracks and also reducing the number of components in the optical system. Also, the reproduction of information with the main spot of the one-dimensional ultra-resolution spots provides the ability to further improve the signal-to-noise ratio of the reproduced signal and to reduce the signal leakage from the adjacent tracks.

What is claimed is:

1. An information reproducing apparatus for reproducing information by moving a magnetic wall along an information track on a recording medium, said apparatus comprising:

an optical system for irradiating the recording medium with a light spot of an oval shape having a longer axis and a shorter axis, of which the longer axis is substantially parallel to the information track and a ratio of the longer axis to the shorter axis is at least 1.4; and movement means for performing relative movement between the light spot and the recording medium.

2. An apparatus according to claim 1, wherein the width of the light spot in a direction perpendicular to the information track is substantially equal to the width of the information track.

3. An apparatus according to claim 1, wherein said optical system comprises an optical filter provided with an opaque band.

4. A method of reproducing information from a recording medium having a memory layer, a switching layer and a displacement layer laminated in this order, each of which layers is comprised of a vertical magnetization layer, wherein a magnetic domain recorded in the memory layer is transferred to the switching layer and the displacement layer by an exchange coupling, and a plurality of information tracks are juxtapositionally established, said method comprising the steps of:

irradiating the recording medium with a light spot to cause high, medium and low temperature regions to appear, the light spot having an oval shape with a longer axis and a shorter axis, of which the longer axis is parallel to the information track from the displacement layer side;

moving the recording medium and the light spot relative to each other, wherein the magnetization of the memory layer disappears in a high temperature region, the magnetization of the switching layer disappears in a medium temperature region, and a domain wall of the magnetic domain transferred to the displacement layer is displaced parallel to the information track toward the high temperature region when the domain wall of the magnetic domain comes to a boundary between the low temperature region and the medium temperature region; and reproducing the information by detecting reflective light of the light spot.

5. The method of reproducing information according to claim 4, further comprising forming a region between adjacent information tracks such that the region prevents influence of an adjacent information track on the domain wall displacement.

6. The method of reproducing information according to claim 5, wherein the region between the information tracks includes a groove formed on the recording medium, and each of the information tracks is comprised of a land partitioned with the groove.

7. The method of reproducing information according to claim 5, wherein magnetism of the region between the information tracks has been made to disappear by annealing.

8. The method of reproducing information according to claim 4, wherein a ratio of the longer axis to the shorter axis of the light spot is equal to at least 1.4.

9. The method of reproducing information according to claim 4, wherein the width of the light spot in a direction perpendicular to the information track is substantially equal to the width of the information track.

* * * * *